(12) United States Patent
Winnick

(10) Patent No.: US 9,984,329 B2
(45) Date of Patent: May 29, 2018

(54) SYSTEMS AND METHODS FOR AUTOMATED TROUBLESHOOTING

(71) Applicant: Daniel M. Winnick, Orinda, CA (US)

(72) Inventor: Daniel M. Winnick, Orinda, CA (US)

( * ) Notice: Subject to any disclaimer, the term of this patent is extended or adjusted under 35 U.S.C. 154(b) by 557 days.

(21) Appl. No.: 14/318,671

(22) Filed: Jun. 29, 2014

(65) Prior Publication Data

US 2015/0032669 A1 Jan. 29, 2015

Related U.S. Application Data

(60) Provisional application No. 61/841,399, filed on Jun. 30, 2013, provisional application No. 61/842,347, filed on Jul. 2, 2013.

(51) Int. Cl.
*G06N 5/04* (2006.01)
*G06F 11/30* (2006.01)

(52) U.S. Cl.
CPC .............. *G06N 5/04* (2013.01); *G06F 11/30* (2013.01)

(58) Field of Classification Search
CPC . G06N 5/04; G06N 5/02; G06N 5/022; G06F 11/30; G06F 17/30; G06F 17/30961
USPC .......................................................... 706/11
See application file for complete search history.

(56) References Cited

U.S. PATENT DOCUMENTS

| | | | | |
|---|---|---|---|---|
| 7,257,741 B1* | 8/2007 | Palenik | ............... | G06F 11/0748 709/220 |
| 2001/0011260 A1* | 8/2001 | Skaanning | ......... | G05B 23/0281 706/46 |
| 2003/0110412 A1* | 6/2003 | Neville | ................ | G03B 15/006 714/25 |
| 2005/0015678 A1* | 1/2005 | Miller | ................. | G06F 11/0748 714/38.14 |
| 2005/0097070 A1* | 5/2005 | Enis | ...................... | G06N 99/005 706/50 |
| 2006/0039547 A1* | 2/2006 | Klein | .................... | H04M 3/523 379/265.02 |
| 2007/0027893 A1* | 2/2007 | Gundy | ................. | H04L 41/5074 |
| 2008/0294423 A1* | 11/2008 | Castellani | ........... | G06F 11/0733 704/4 |
| 2012/0191629 A1* | 7/2012 | Shae | .................. | G06F 17/30637 706/11 |
| 2013/0036062 A1* | 2/2013 | Natarajan | ............ | G06Q 30/016 705/304 |
| 2013/0297544 A1* | 11/2013 | Allgaier | ............... | G06N 99/005 706/46 |
| 2014/0068330 A1* | 3/2014 | Hecox | ................. | G06F 11/0706 714/26 |

(Continued)

*Primary Examiner* — Dave Misir
(74) *Attorney, Agent, or Firm* — Kang S. Lim

(57) ABSTRACT

The present invention relates to systems and methods for automated troubleshooting. User identification is recorded, and the problem to be solved is determined. A series of decision trees are used to guide the user through troubleshooting. If the problem is resolved at any point, the event is logged as successful. This logging includes a listing of the steps taken by the user. The log may be employed to tune the decision tree for more optimal performance in the future. If no successful solutions are achieved, then the session may be forwarded to a human representative for resolution. Part of this forwarding includes classifying the event by at least one failure code. The failure code reflects the steps taken while guiding the user.

20 Claims, 7 Drawing Sheets

(56) References Cited

U.S. PATENT DOCUMENTS

2014/0228005 A1* 8/2014 Huang .............. H04M 3/42059
455/414.1

* cited by examiner

SYSTEMS AND METHODS FOR AUTOMATED TROUBLESHOOTING

CROSS REFERENCE TO RELATED APPLICATION

This non-provisional application claims the benefit of provisional application No. 61/841,399 filed on Jun. 30, 2013, entitled "Systems and Methods for Automated Troubleshooting", which application is incorporated herein in its entirety by this reference.

This non-provisional application also claims the benefit of provisional application No. 61/842,347 filed on Jul. 2, 2013, entitled "Systems and Methods for Automated Troubleshooting", which application is incorporated herein in its entirety by this reference.

BACKGROUND

The present disclosure relates to automated and semi-automated troubleshooting for a wide variety of systems. More particularly, the present invention relates to leveraging decision trees to reduce costs incurred by companies for customer support.

Due to the fast evolution of technology, even technologically savvy individuals are often faced with problems when installing or using consumer electronic devices. Regardless of the users technical abilities, when such problems arise it can be a large frustration and time commitment to have resolved. This frustration is one leading causes of lost customers. As such, most consumer hardware and software companies, or companies who provide services that rely upon hardware or software, expend significant resources upon technical help lines. These help lines are traditionally large phone centers that have representatives with some degree of technical expertise. A customer who is experiencing a problem will call the technical help line, and be coached through diagnostic and service protocols until the problem is resolved. If resolution isn't possible over the phone, often the customer will have the option of returning the device, or an in person repair service. More recently, chat systems and remote access have enabled technical help representatives to trouble shoot user's systems more efficiently.

While such methods for troubleshooting and resolving user technical problems work generally well, there are a few acute areas for improvement. From the user's perspective, the time required to get a representative's assistance is typically onerous. Users are often put on hold for minutes, if not tens of minutes prior to being connected with a representative. Further, once in contact with the representative, often service is slow because these representatives are often juggling multiple tech service calls simultaneously to maximize efficiency on their end. All this wasted time for the user can become severely wearing. Further, there is no guarantee that the individual the user is speaking with knows the user's language, or is easy to understand. This becomes particularly important as more and more call centers are offshored, and the representatives have strong accents and reduced phone sound quality.

From the company's perspective, maintaining large call centers which are reachable at odd hours and capable of dealing with spikes in customer calls is a very expensive endeavor. In order to mitigate these costs, companies often rely upon outsourcing, and workforce reduction. However, as previously noted, the outsourcing to other countries may result in language hurdles, and the reduction in staff invariably results in longer waits or reduced service.

Traditionally, automation would be relied upon to overcome these sorts of hurdles; but for troubleshooting of technical issues this has been elusive due to the large number of variables associated with diagnosing the problem. Current belief is that a person is required to solve these sorts of technical issues.

Sometimes, however, the problems being reported into the company belong to a set of common issues. These commonalities may be due to the design features of the systems, or due to known compatibility issues with infrastructure of other devices/software. In fact, much of the time the problems being called into a tech help line are routine issues that are readily resolved. This is particularly true when the user base is less technologically proficient, such as when the product or service is consumed by the general population.

One clear example of this is with high speed internet connectivity. Companies provide broadband internet service where the user is mailed hardware for self-installation. While most of these installations are completed without any issue, there is some percentage where it is unsuccessful. By following some basic protocols the vast majority of these problems may be addressed, but still many of these disgruntled users call into customer service helplines to get the issue resolved.

Traditionally, companies have attempted to reduce the frequency of these calls by including troubleshooting guides or a recorded message with tips while the user is on wait for a representative. However, none of these systems do much to actually resolve the customers problem, and further no data is generated to help streamline the troubleshooting process.

As such an urgent need exists for systems and methods for automating the troubleshooting process. Such systems and methods will reduce companies costs associated with technical service, and provide faster and more accurate troubleshooting solutions for users.

SUMMARY

The present invention discloses systems and methods for the automated troubleshooting of problems common to consumer goods and services. Such systems and methods will reduce companies costs associated with technical service, and provide faster and more accurate troubleshooting solutions for users.

In some embodiments, the systems and methods for automated troubleshooting records user identification. Likewise, the problem to be solved may also be determined. The systems and methods employ a series of decision trees to guide the user through troubleshooting. The steps taken are all recorded in order to generate useful heuristics.

In some cases, the guiding steps are all performed in a language chosen by the user, and at a pace selected by the user. If the problem is resolved at any point, the event is logged as successful. This logging includes a listing of the steps taken by the user. The log may be employed to tune the decision tree for more optimal performance in the future.

If no successful solutions are achieved, the systems and methods may elevate the user to a higher decision tree. If the decision tree and the higher decision tree(s) are all exhausted without resolving the problem, then the session may be forwarded to a human representative for resolution. Part of this forwarding includes classifying the event by at least one failure code. The failure code reflects the steps taken while guiding the user, and helps the human representative narrow down issues more efficiently. In some embodiments, the human representative is selected by language skills, area of expertise and skill level.

Note that the various features of the present invention described above may be practiced alone or in combination. These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
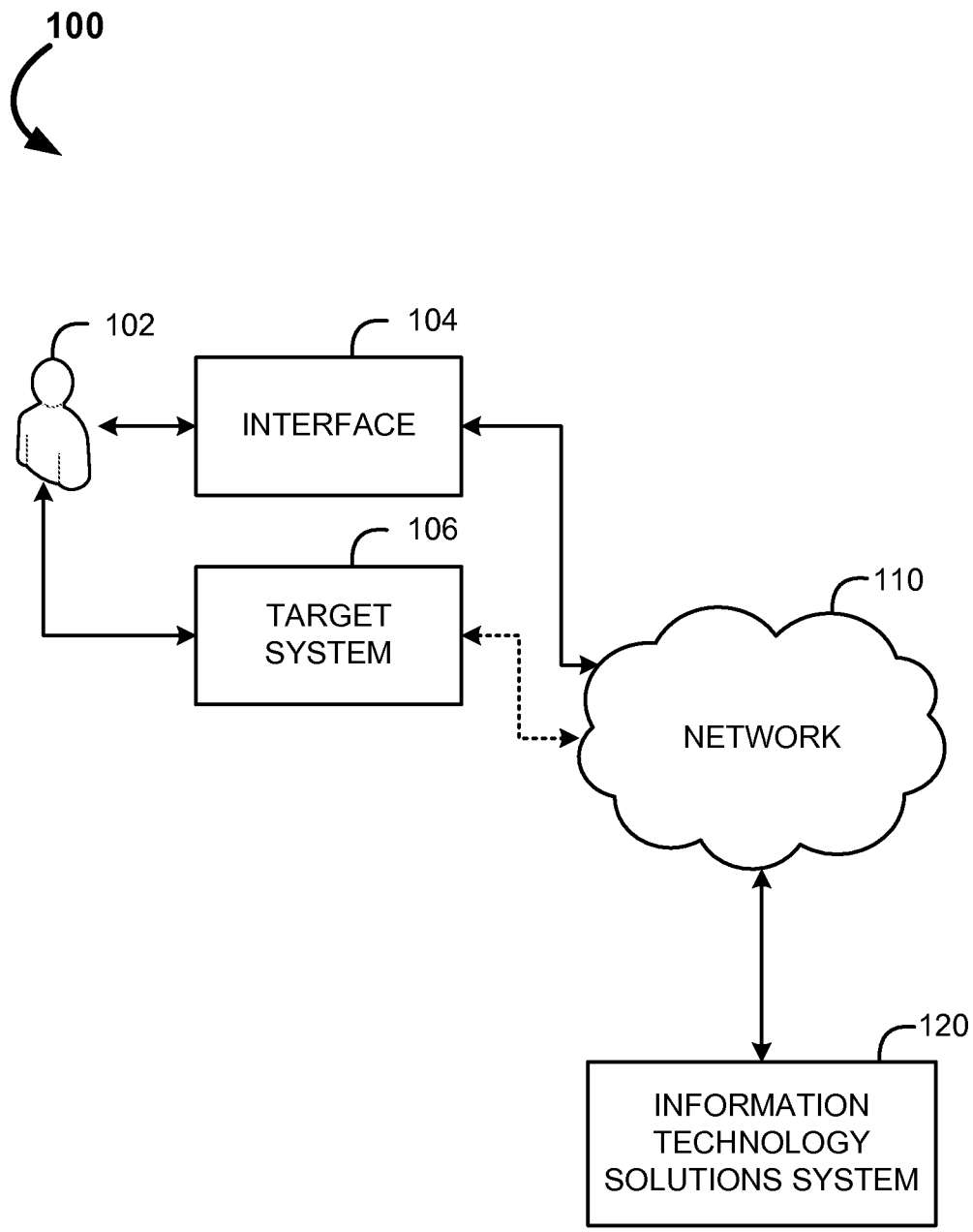
FIG. 1 is an example logical block diagram of a system for automated troubleshooting, in accordance with some embodiments of the present invention.

The present invention will now be described in detail with reference to selected preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention. The features and advantages of the present invention may be better understood with reference to the drawings and discussions that follow.

Aspects, features and advantages of exemplary embodiments of the present invention will become better understood with regard to the following description in connection with the accompanying drawing(s). It should be apparent to those skilled in the art that the described embodiments of the present invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. Hence, use of absolute terms, such as, for example, "will," "will not," "shall," "shall not," "must," and "must not," are not meant to limit the scope of the present invention as the embodiments disclosed herein are merely exemplary.

As previously noted, the ability to provide prompt, accurate and user friendly technical support can ensure a company retains its customer base. In fact, despite the large cost that technical support services requires, most companies that sell directly to consumers have determined it is a solid investment. Thus, any system which improves upon technical support, while simultaneously reducing costs will be highly coveted.

Note that while much of the discussion contained herein relates to a system designed for use with a customer service automated phone system, it is understood that in today's world customers are communicating with companies in a wide multitude of ways. As such, the present systems and methods may be readily adapted to a wide range of platforms, such as voice phone systems, text message systems, television interfaces, internet based systems, book systems and video game console interfaces.

Thus, for the sake of clarity, while the discussion shall center on automated touchtone phone systems, it is intended that these examples are for illustrative purposes only, and are not intended to unduly limit the scope of the disclosure. For example, those skilled in the art will readily identify that a decision tree navigable by touch tones may just as readily be navigated by a game console display or via a voice recognition system. Thus, all of these permutations are intended to be covered by the instant disclosure.

The following description of some embodiments will be provided in relation to numerous subsections. The use of subsections, with headings, is intended to provide greater clarity and structure to the present invention. In no way are the subsections intended to limit or constrain the disclosure contained therein. Thus, disclosures in any one section are intended to apply to all other sections, as is applicable.

I. Automated Troubleshooting Systems

To facilitate discussion, FIG. 1 is an example logical block diagram of a system 100 for automated troubleshooting, in accordance with some embodiments. In this system 100 a user 102 is experiencing difficulty with a target device 106. This target device 106 may be anything, from a new laptop, to wireless internet service, to a cell phone, to a power tool. While, clearly, the need for troubleshooting tends to be highest in the field of consumer electronics, just about any product or service could benefit from such an automated troubleshooting system.

In addition to having access to the target system/device 106, the user 102 has access to an interface 104 which can be utilized to communicate with an information technology (IT) solutions system 120 via a network 110. As previously mentioned, the interface 104 may be any of a touchtone phone system, voice phone systems, text message systems, television interfaces, internet based systems, book systems, video game console interfaces, and the like. Likewise, the network 110 may depend upon the platform being employed. However, most typically the network 110 will be a phone system, a cellular network, the internet or some combination thereof.

The information technology solutions system 120, in some embodiments, may be configured to communicate with the user 102 to provide automated assistance with the problem being experienced with the target system/device 106. In some particular instances, the target system 106 may itself have access to the network 110 (or another network), and provide back diagnostic or operability data to the information technology solutions system 120 to assist in the troubleshooting.

For example, in the context of modern television systems, the receiver and decoder box often has internet accessibility. An automated troubleshooting system could be employed where when a user 102 has an issue with the television system (for example on-demand movies are unavailable), the user 102 has the ability to call the service hotline (over a phone network 102). The information technology solutions system 120 would then be capable of cross referencing the user's phone number with the user's account. The information technology solutions system 120 could then, in this specific example, query the receiver box via an internet backchannel (a separate network) to determine basic diagnostic data. Such data could include, for example, the receiver's internet connectivity, cable signal strength, etc. This data could then be utilized by the information technology solutions system 120 to lead the user 102 through a decision tree best suited to resolve the issue.

To expand the example further, assume the information technology solutions system 120 determines that the receiver is not connected to the internet based upon the query. Also assume that on-demand movies are streamed directly to the receiver via the internet. The information technology solutions system 120 would thus enter into automated troubleshooting to attempt to resolve the connectivity issue. In contrast, if the backchannel determines that the receiver is indeed properly connected to the internet, a different automated troubleshooting pathway may be employed.

Figure 2:
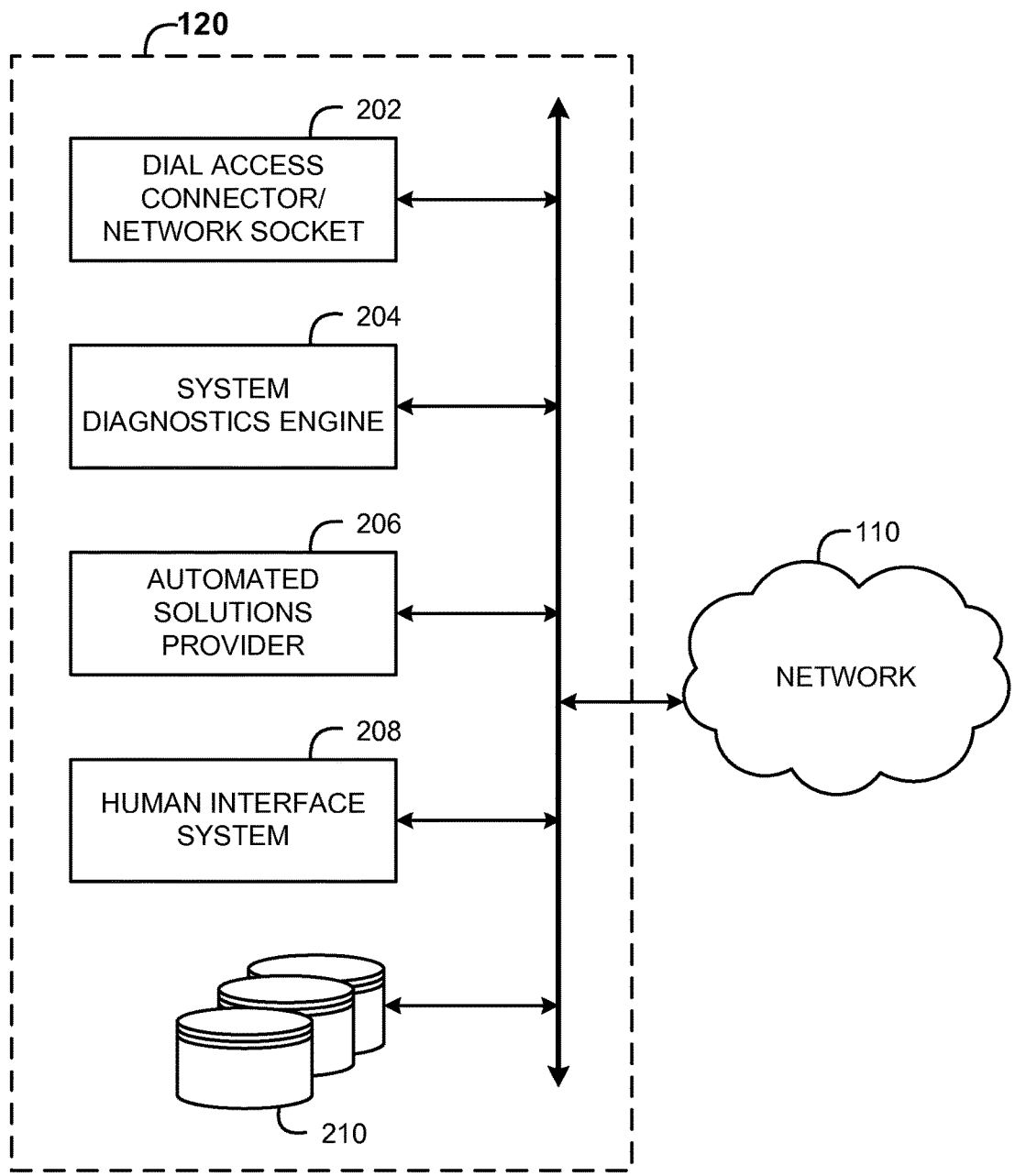
FIG. 2 is an example logical block diagram of the information technology solutions system capable of providing automated troubleshooting, in accordance with some embodiments of the present invention.

Moving to FIG. 2, a more detailed example logical block diagram of the information technology solutions system 120 is provided. In this example diagram, logical subsystems are illustrated as separate modules coupled to one another via a central bus. In some embodiments, this may be an accurate physical description of the system architecture. However, it is also likely that one or more of these logical subsystems are in fact embodied within the same physical hardware and this connectivity is merely conceptual. Further, it can be readily envisioned where such a system exists in a distributed cloud architecture, with no set designated physical device handling each system, but rather dynamic resources fulfilling the processing needs of any given task.

Within the information technology solutions system 120 there exists a dial access connector and/or network socket 202 which enables the routing and handling of incoming communications. For example, in the previous example, a dial access connector would be capable of receiving the incoming call, and routing it through the appropriate automated troubleshooting menus. In some alternate embodiments, a network socket may receive incoming data from an API located on a computer system. Likewise, similar systems may be employed for dealing with text messaging platforms, game console systems, etc. In this manner, any of the platforms previously discussed may be well suited for usage in conjunction with the information technology solutions system 120.

The information technology solutions system 120 also includes data banks 210 which includes, at a minimum, decision trees or other algorithms of automated troubleshooting. In addition the data banks 210 may include user account information, troubleshooting logs, equipment model information, and diagnostic information. All of this data may be employed by a system diagnostics engine 204 to generate a series of questions that will guide the user to a resolution regarding the problem. If backchannel diagnostic information is also available, as previously discussed, this data may likewise be employed by the diagnostics engine 204 to resolve the problem.

An automated solutions provider 206 may employ the decision tree(s) identified by the diagnostics engine 204 to generate a user friendly interface for the user 102 to interact with. For example, the automated solutions provider 206 may, in some embodiments, allow the user 102 to select their native language. After which, all future dialog will be completed in the language of choice, regardless of the background decision scripts being run.

In instances where there is a failure in the automated troubleshooting, it becomes necessary to involve a customer service representative. The information technology solutions system 120 thus includes a human interface system 208 which is designed to elevate the troubleshooting issue to a human operator. In some embodiments, the point of failure, language selection and general sophistication of the user 102 may be leveraged to direct the service call to a representative most capable of efficiently dealing with the issue.

For example, if the user speaks French, and is highly sophisticated, and is having issues with network connectivity of a system, the human interface system 208 may be configured to ensure the representative the call is routed to, at a minimum speaks French. Further, the human interface system 208 may direct the call to a network specialist, if available. By dividing the incoming calls into language, specialization and/or sophistication level, the automated system may be able to improve call center efficiency even if it is unable to solve the problem without human intervention.

In this manner, an automated system for troubleshooting is a marked improvement over traditional customer service solutions. An automated system allows a user 102 to get help immediately, rather than waiting in inordinately long queues for a human representative. Often users are embarrassed by their lack of technical knowledge, and therefore avoid calling into a help line. An automated system eliminates this embarrassment but allowing the user the ability to solve "stupid" issues with a sense of anonymity, and only reaching a human representative for more serious issues. Further, the pace of the automated troubleshooting may be guided entirely by the user 102. Thus there is no sense of pressure felt by the user to complete the diagnostic rapidly.

From the company's perspective, an automated system of this sort allows for reduced customer service staffing. Further, those issues that persist past the automated system can be targeted to representatives most apt to resolve them. Thus the efficiency is realized via faster and more efficient resolution time by the human operators. Thus, the presently disclosed system and methods of automated troubleshooting results in an improved cost structure while simultaneously improving service.

II. Method for Automated Troubleshooting

Figure 3:
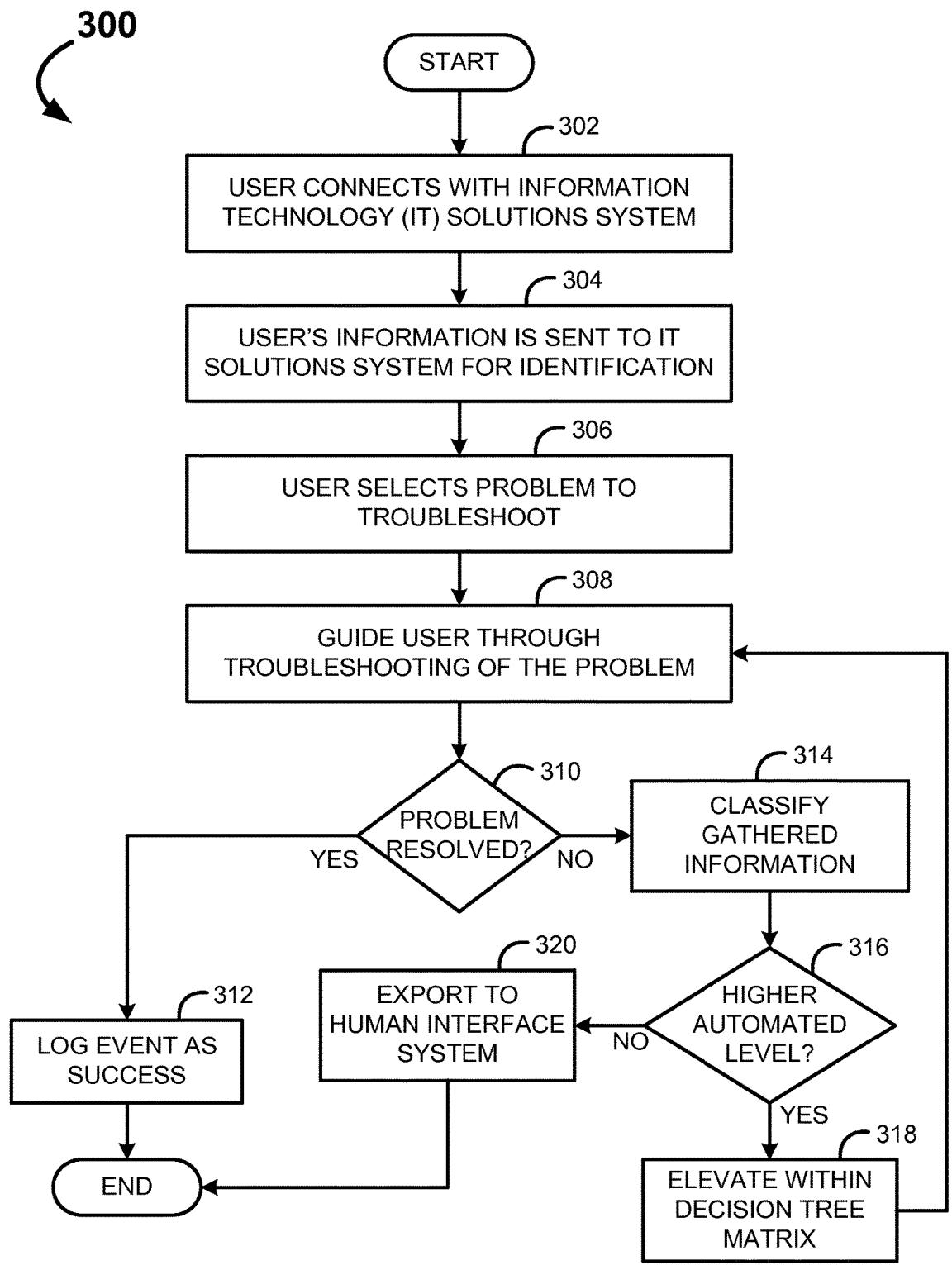
FIG. 3 is an example flow chart for the process of automated troubleshooting, in accordance with some embodiments of the present invention.

FIG. 3 is a flow chart illustrating an exemplary method for automated troubleshooting, in accordance with some embodiments, shown generally at 300. The process begins with the user connecting with the information technology solutions system (at 302) via the network and an interface. As previously discussed, the interface and network may include any multitude of systems, such as a phone and a phone network, a computer system and the internet, or a cell phone and a cellular network, for example.

The user's information is sent to the information technology solutions system for identification purposes (at 304). This identifying information may include an account number, a phone number, IP address, or the like. The user also provides what type of problem they are experiencing (at 306). This selection process may be augmented, as previously discussed, by backchannel data in circumstances where the problem device/system has internet or other connectivity, and is configured for remote diagnostics.

The information technology solutions system then assesses the technical competency level of the user, and uses this assessment to guide the user through a series of questions, driven by decision trees generated to identify most common issues, in order to troubleshoot the issue (at 308). User's technical assessment may be accomplished via self-assessment where the user inputs his or her comfort with technology, or may take the form of a learning based guide, where user selections that suggest the user is more or less technologically capable feeds back to determine what the next steps should be. For example, if the user selects a basic issue and cannot solve basic problems such as identifying the router, then the decision tree utilized to guide the user may be significantly more simplistic than for, say, a user who is having a network socket issue.

Next, a determination is made if the problem was resolved (at 310), and if so the event is logged as a success (at 312). This logging may include an analysis of which steps were taken by the user to get to a successful resolution. These successful event logs may be employed to fine tune the decision trees in order to maximize the resolution of issues within the least number of steps for future users.

If the problem was not solved, however, the system may classify the gathered information (at 314). This classification may include listing a series of failure codes for steps taken to resolve the issues, but were ultimately unsuccessful. These failure logs may be particularly helpful for a representative dealing with the issue later in order to reduce the need for redundant operations by the user. For example, if a user has network connectivity issues, and the system instructs the user to reboot the modem, and this step fails to resolve the issue, then if the problem is elevated to a representative, this modem reboot procedure will be listed in the failure logs. The representative will then not need to have the user go through this step again, thereby saving everyone time, and reducing overall frustration.

After the gathered information has been classified, another query is made on whether there is a higher level of automated troubleshooting available (at 316). If so the system elevates the troubleshooting within the decision tree matrix to the next higher level (at 318) and repeats the procedure from the point of guiding the user through troubleshooting of the problem (at 308).

However, if all levels of the decision tree are exhausted for the problem, then the system may elevate the troubleshooting session to the human interface system (at 320). In this step, a representative well suited to resolve the problem if selected and the classified failure and identification information may be provided to the human representative for efficient resolution to the problem.

III. Examples

Now that the general system and method for automated troubleshooting has been provided, an example troubleshooting flow chart example will be provided to illustrate how such systems and methods may be employed within the very real-world issue of a home wireless network not being accessible to a user. Note that the following example is intended to be entirely illustrative in nature, and does not limit the scope of the present disclosure in any way.

As previously noted the user contacts the automated troubleshooting system, provides some information that may be used to identify the user, and selects the problem as "no wireless internet" from a list of common problems, in this example. The system would next guide the user through a troubleshooting dialog to generate data on the problem and, hopefully, resolve the issue. This troubleshooting process is detailed in the example FIGS. 4-6 which disclose a process the system may lead the user through.

Figure 4:
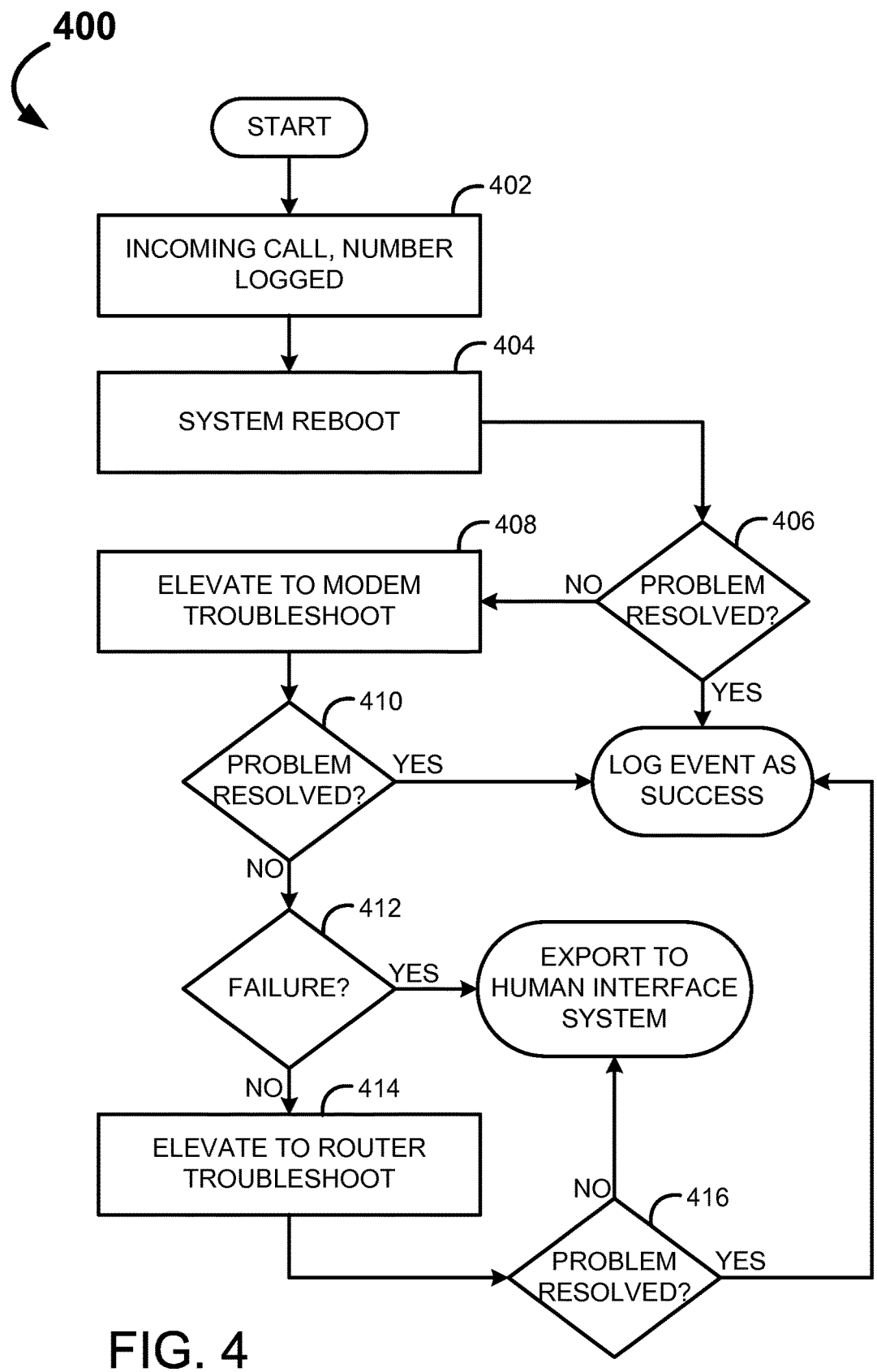
FIG. 4 is an example top-level flow chart for an example process of automated troubleshooting for internet connectivity, in accordance with some embodiments of the present invention.

In the process 400 of FIG. 4, the user is using a phone system to interact with the automated troubleshooting system. The phone number the user is calling from is logged and used as identification (at 402). In some cases, this number may be referenced back to a registry to determine the user's actual identification or account information. The automated troubleshooting prompts the user to perform a system reboot (at 404) in an attempt to resolve the issue. The user is queried whether the problem was solved (at 406) through the reboot. If so, the steps taken are recoded and the event is logged as a success. If not, the process gets elevated to a model troubleshooting decision tree (at 408).

Figure 5:
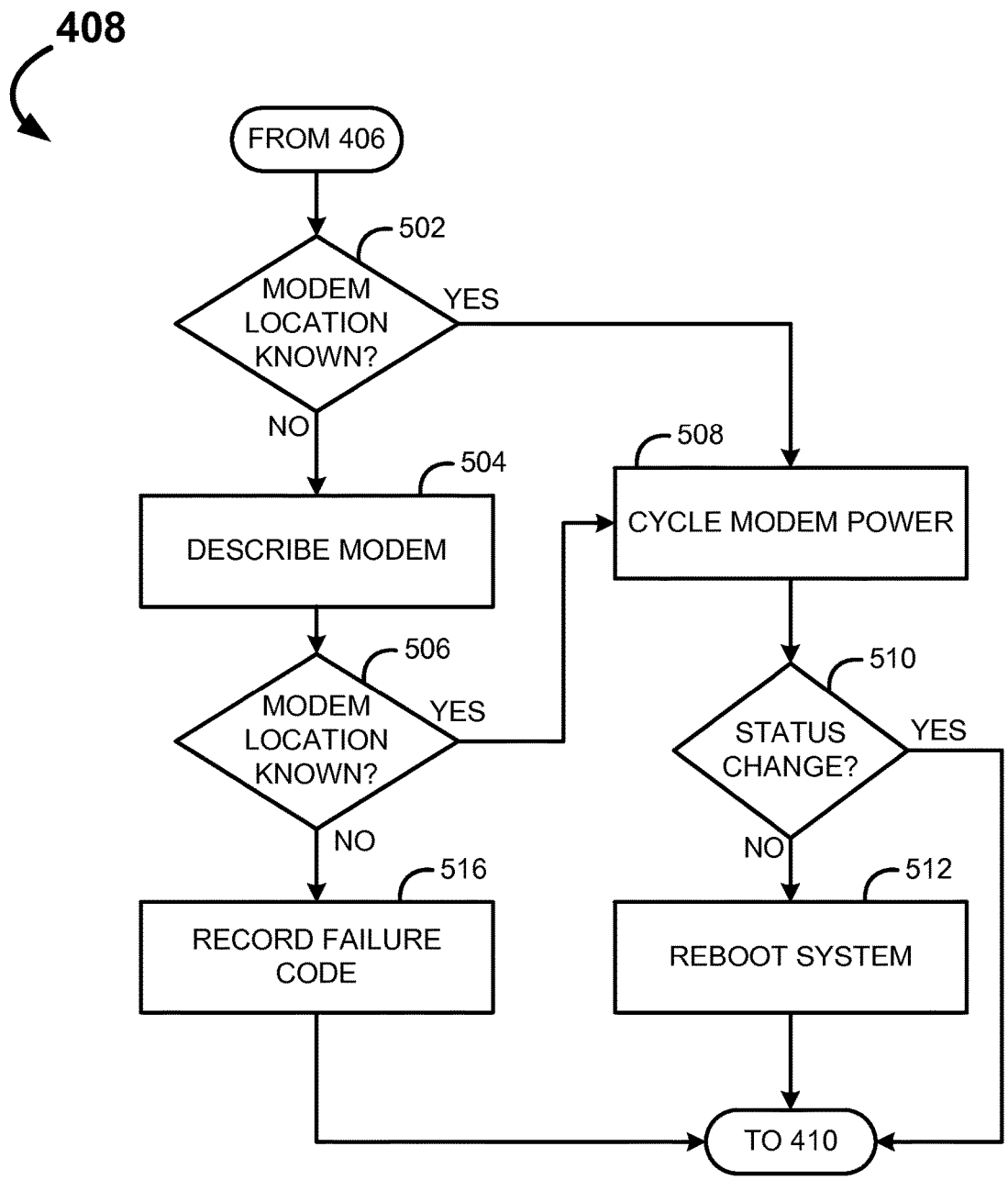
FIG. 5 is an example flow chart for the modem troubleshooting decision tree, in accordance with some embodiments of the present invention.

FIG. 5 provides a more detailed explanation of the process for modem troubleshooting. In this example process, the user is asked if the modem location is known (at 502). If not, the modem is described to the user (at 504) and then the user is once again asked if the modem location is known (at 506). If the user is still unable to find the modem, then the session records a failure code (at 516) indicating that the modem was never found.

However, if at either point the user indicates the location of the modem is known, then the user can be prompted to cycle the modem's power (at 508). The system then can inquire if there is a status change (at 510). If so, the problem may have been resolved and this is checked for. If not, the user may also be prompted to reboot the computer system (at 512).

The modem troubleshooting can result in success, failure or an elevation to another level of troubleshooting. For example, if the modem is not identified, then the process fails entirely. If the reboot or cycling of modem power resolves the issue, then there is a success. However, if the modem is rebooted without a change in status, then the process elevates the troubleshooting to another level.

Returning to FIG. 4, the process undergoes a series of queries to determine if the troubleshooting resolved the issue (at 410) or if there was a failure (at 412). If either is true, then the event is logged as a success or failure as described above. However, if nether is true, then the process may be elevated to a router troubleshooting decision tree (at 414).

Figure 6:
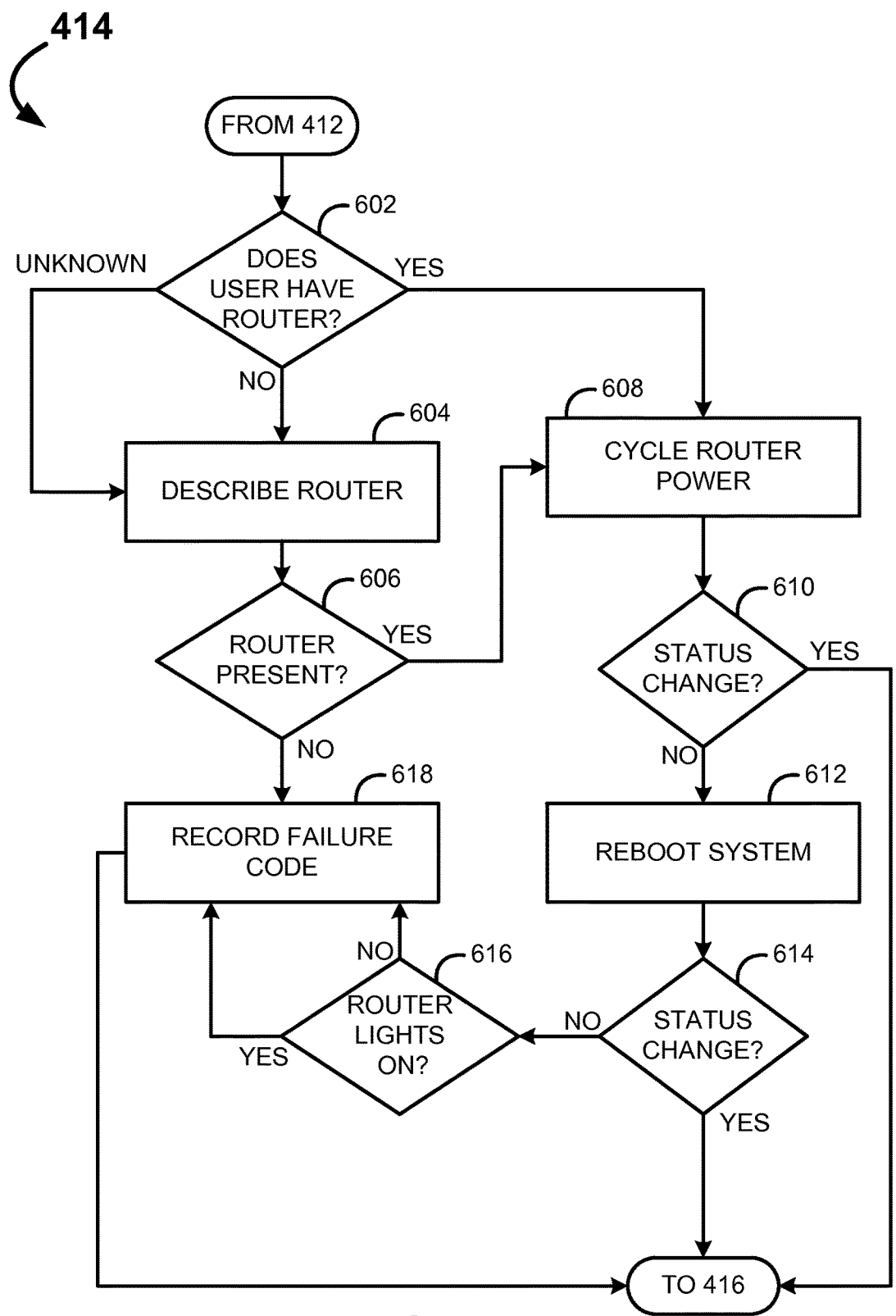
FIG. 6 is an example flow chart for the router troubleshooting decision tree, in accordance with some embodiments of the present invention.

FIG. 6 provides a more detailed explanation of the process for router troubleshooting. In this example process, the user is asked if the router location is known (at 602). In this example, the user can indicate that if or if not the router location is known, or whether the user is unsure of the router location.

An unsure answer, or if the user does not know the router location results in the router being described to the user (at 604). The user is once again asked if the router location is known (at 606). If the user is still unable to find the router, then the session records a failure code (at 618) indicating that the router was never found.

However, if at either point the user indicates the location of the router is known, then the user is be prompted to cycle the router's power (at 608). The system then can inquire if there is a status change (at 610). If so, the problem may have been resolved and this is checked for. If not, the user may also be prompted to reboot the computer system (at 612).

After the reboot, the user is again asked if there is a status change (at 614). If so, the problem may have been resolved and this is checked for. If not, the process inquires with the user if the router lights are on (at 616). Regardless of router lights being on this stage in the process results in the generation of an failure code (at 618), however, different failure codes are generated depending upon the router's light status.

Returning to FIG. 4, the process may determine if any measure taken under the router troubleshooting process resolved the issue (at 416). If so, the event is logged as successful. However, if not, there is no higher levels of the troubleshooting matrix, and the session is classified accordingly.

During this classification, all failure codes that were generated are collected and exported along with the identification to a human representative in order to help resolve the problem. For an internet connectivity problem like the one just provided, the failure codes that could be generated may include some of the following:

Failed01*=user couldn't find modem
Failed02*=the modem didn't have any lights lit
Failed03*=the modem had lights on, no separate router was present, user rebooted computer before and after modem reboot.
Failed04*=user couldn't find modem's power cable
Failed05*=user couldn't find router, modem had lights on, separate router was present, user rebooted computer before and after modem reboot.
Failed06*=user couldn't find the power cable of router, modem had lights on, separate router was present, user rebooted computer before and after modem reboot.
Failed07*=both the modem and router had lights on, separate router was present, user rebooted computer before and after modem reboot and after the router reboot
Failed08*=the router had all lights off, modem had lights on, separate router was present, user rebooted computer before and after modem reboot and after the router reboot Clearly, the example automated process disclosed herein is one of a number of ways in which internet connectivity troubleshooting can be performed. As noted, by logging successful resolutions, and the steps undertaken to reach these resolutions, the troubleshooting decision trees can be modified to most optimally resolve these sorts of problems in future cases.

IV. System Embodiments

Figure 7A:
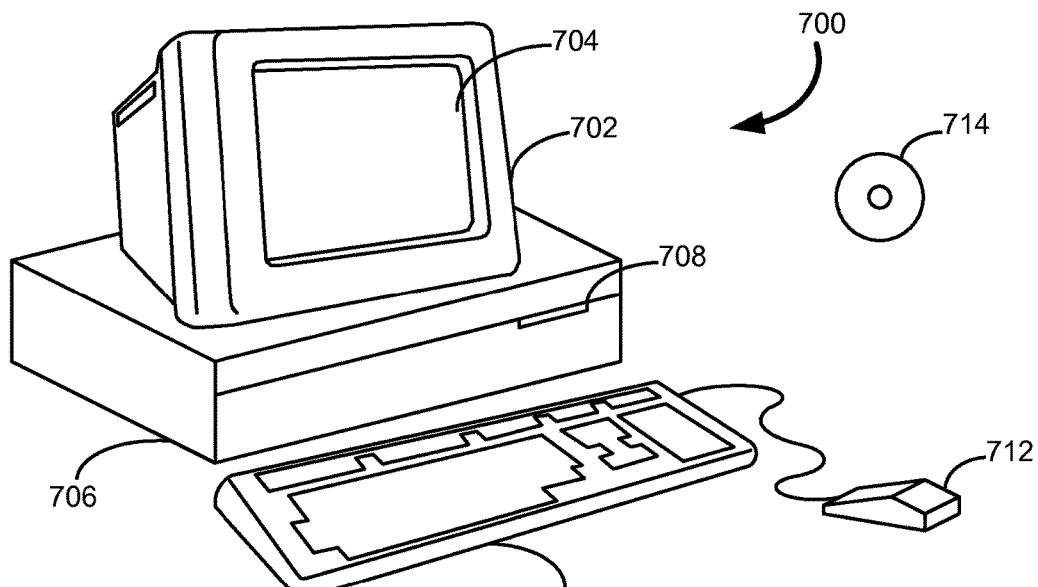
FIGS. 7A and 7B illustrate example computer systems capable of executing at least portions of the disclosed embodiments.
Figure 7B:
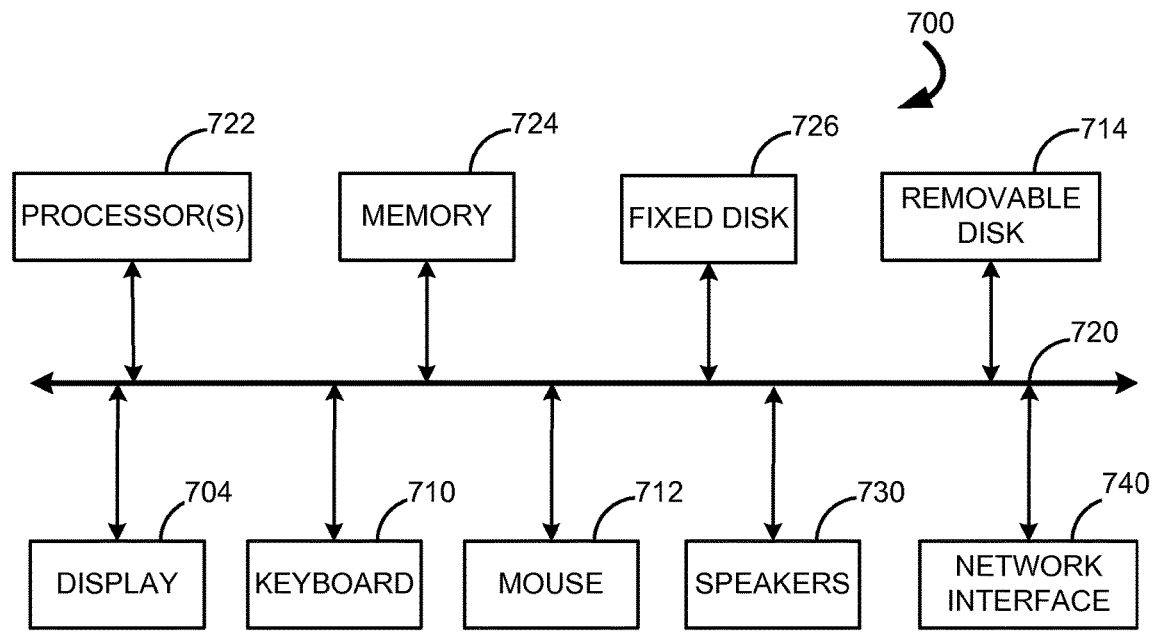

FIGS. 7A and 7B illustrate a Computer System 700, which is suitable for implementing embodiments of the present invention. FIG. 7A shows one possible physical form of the Computer System 700. Of course, the Computer System 700 may have many physical forms ranging from a printed circuit board, an integrated circuit, and a small handheld device up to a huge super computer. Computer system 700 may include a Monitor 702, a Display 704, a Housing 706, a Disk Drive 708, a Keyboard 710, and a Mouse 712. Disk 714 is a computer-readable medium used to transfer data to and from Computer System 700.

FIG. 7B is an example of a block diagram for Computer System 700. Attached to System Bus 720 are a wide variety of subsystems. Processor(s) 722 (also referred to as central processing units, or CPUs) are coupled to storage devices, including Memory 724. Memory 724 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A Fixed Disk 726 may also be coupled bi-directionally to the Processor 722; it provides additional data storage capacity and may also include any of the computer-readable media described below. Fixed Disk 726 may be used to store programs, data, and the like and is typically a secondary storage medium (such as a hard disk) that is slower than primary storage. It will be appreciated that the information retained within Fixed Disk 726 may, in appropriate cases, be incorporated in standard fashion as virtual memory in Memory 724. Removable Disk 714 may take the form of any of the computer-readable media described below.

Processor 722 is also coupled to a variety of input/output devices, such as Display 704, Keyboard 710, Mouse 712 and Speakers 730. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, motion sensors, brain wave readers, or other computers. Processor 722 optionally may be coupled to another computer or telecommunications network using Network Interface 740. With such a Network Interface 740, it is contemplated that the Processor 722 might receive information from the network, or might output information to the network in the course of performing the above-described multi-merchant tokenization. Furthermore, method embodiments of the present invention may execute solely upon Processor 722 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher level code that are executed by a computer using an interpreter.

In sum, systems and methods for automated troubleshooting are provided. While a number of specific examples have been provided to aid in the explanation of the present invention, it is intended that the given examples expand, rather than limit the scope of the invention. Although sub-section titles have been provided to aid in the description of the invention, these titles are merely illustrative and are not intended to limit the scope of the present invention.

While the systems and methods have been described in functional terms, embodiments of the present invention may include entirely hardware, entirely software or some combination of the two. Additionally, manual performance of any of the methods disclosed is considered as disclosed by the present invention.

While this invention has been described in terms of several preferred embodiments, there are alterations, permutations, modifications and various substitute equivalents, which fall within the scope of this invention. It should also be noted that there are many alternative ways of implementing the methods and systems of the present invention. It is therefore intended that the following appended claims be interpreted as including all such alterations, permutations, modifications, and various substitute equivalents as fall within the true spirit and scope of the present invention.

What is claimed is:

1. A method for automated troubleshooting comprising:
   recording user identification;
   generating questions for the user by a system diagnostic engine to determine a problem to be solved for a target system, wherein the questions and user responses are communicated via a first channel;
   collecting backchannel information from the target system via a second communication channel when available to confirm the problem;
   assessing the user's technical competency level based upon at least one of reported self-assessment by the user and a learning based guide which presents the user with a series of predetermined assessment evaluation questions and the user's success at solving the predetermined assessment evaluation questions is a feedback loop to determine the user's competency level;
   assessing the user's competency level and the problem to select a previous decision tree from a plurality of decision trees using the system diagnostic engine;
   guiding the user through the previous decision tree using an automated system, with a processor, wherein the automated system generates an interface for guiding the user, using the previous decision tree selected by the system diagnostic engine; and
   recording steps taken, while guiding the user, as an event.

2. The method of claim 1, further comprising resolving the problem and logging the event as successful, wherein the logging includes a listing of the steps taken by the user.

3. The method of claim 2, wherein the listing of the steps taken by the user is used to tune the previous decision tree.

4. The method of claim 1, further comprising elevating the user to a higher decision tree if no successful solution to the problem is achieved in the previous decision tree, and wherein the higher decision tree is selected from the plurality of decision trees based upon a failure point in the previous decision tree.

5. The method of claim 4, further comprising exhausting the previous decision tree and the higher decision tree without resolving the problem.

6. The method of claim 5, further comprising classifying the event by at least one failure code, wherein the failure code reflects the steps taken while guiding the user.

7. The method of claim 6, further comprising elevating the problem to a human representative.

8. The method of claim 7, further comprising providing the event classification to the human representative.

9. The method of claim 8, wherein the human representative is selected by language skills, area of expertise and skill level.

10. The method of claim 1, wherein the guiding the user is done in a language chosen by the user or detected by the automated system.

11. An automated troubleshooting system comprising:
    an interface configured to receive user identification;
    a system diagnostic engine configured to generate questions for the user to determine a problem to be solved for a target system, wherein the questions and user responses are communicated via a first channel;
    a second communication channel for collecting backchannel information from the target system when available, to confirm the problem;
    an automated solutions provider, having a processor, configured to assess the user's technical competency level based upon at least one of reported self-assessment by the user and a learning based guide which presents the user with a series of predetermined assessment evaluation questions and the user's success at solving the predetermined assessment evaluation questions is a feedback loop to determine the user's competency level;
    the system diagnostic engine further configured to assess the user's competency level and the problem to select a previous decision tree from a plurality of decision trees;
    the automated solutions provider further configured to guide the user through the previous decision tree by generating an interface for guiding the user, using the previous decision tree selected by the system diagnostic engine; and
    a database configured to record steps taken, while guiding the user, as an event.

12. The automated system of claim 11, wherein the automated solutions provider resolves the problem and wherein the database logs the event as successful, wherein the logging includes a listing of the steps taken by the user.

13. The automated system of claim 12, wherein the listing of the steps taken by the user is used to tune the previous decision tree.

14. The automated system of claim 11, wherein the automated solutions provider elevates the user to a higher decision tree if no successful solution to the problem is achieved in the previous decision tree, and wherein the higher decision tree is selected from the plurality of decision trees based upon a failure point in the previous decision tree.

15. The automated system of claim 14, wherein the automated solutions provider exhausts the previous decision tree and the higher decision tree without resolving the problem.

16. The automated system of claim 15, wherein the automated solutions provider classifies the event by at least one failure code which is stored in the database, wherein the failure code reflects the steps taken while guiding the user.

17. The automated system of claim 16, further comprising a human interface configured to elevate the problem to a human representative.

18. The automated system of claim 17, wherein the human interface provides the event classification to the human representative.

19. The automated system of claim 18, wherein the human interface selects the human representative based upon language skills, area of expertise and skill level.

20. The automated system of claim 11, wherein the automated solutions provider guides the user in a language chosen by the user.

* * * * *